United States Patent
Koerner et al.

(10) Patent No.: US 11,731,599 B2
(45) Date of Patent: Aug. 22, 2023

(54) DEVICE AND METHOD FOR OPERATING A BRAKING SYSTEM OF A MOTOR VEHICLE

(71) Applicant: Robert Bosch GmbH, Stuttgart (DE)

(72) Inventors: Gotthilf Koerner, Weissach (DE); Oda Limbach, Stuttgart (DE); Ruben Obenland, Grossbottwar (DE); Simon Riedel, Grossbottwar (DE); Stefan Hoess, Hessigheim (DE)

(73) Assignee: Robert Bosch GmbH, Stuttgart (DE)

( * ) Notice: Subject to any disclaimer, the term of this patent is extended or adjusted under 35 U.S.C. 154(b) by 596 days.

(21) Appl. No.: 16/631,987

(22) PCT Filed: Jun. 14, 2018

(86) PCT No.: PCT/EP2018/065787
§ 371 (c)(1),
(2) Date: Jan. 17, 2020

(87) PCT Pub. No.: WO2019/015890
PCT Pub. Date: Jan. 24, 2019

(65) Prior Publication Data
US 2020/0231132 A1 Jul. 23, 2020

(30) Foreign Application Priority Data
Jul. 19, 2017 (DE) .......................... 102017212359.1

(51) Int. Cl.
*B60T 8/176* (2006.01)
*B60T 8/88* (2006.01)
(Continued)

(52) U.S. Cl.
CPC .............. *B60T 8/176* (2013.01); *B60T 8/885* (2013.01); *B60T 13/686* (2013.01);
(Continued)

(58) Field of Classification Search
CPC ........ B60T 8/176; B60T 8/885; B60T 13/686; B60T 17/221; B60T 2270/10;
(Continued)

(56) References Cited

U.S. PATENT DOCUMENTS 5,648,759 A * 7/1997 Miller ..................... B60T 8/404
340/661
2004/0046444 A1 3/2004 Heubner et al.
(Continued)

FOREIGN PATENT DOCUMENTS

DE 10060702 A1 6/2002
DE 10307509 A1 9/2004
(Continued)

OTHER PUBLICATIONS

Machine Translation of WO-2015188957-A1 (Year: 2015).*
International Search Report for PCT/EP2018/065787, dated Aug. 29, 2018.

*Primary Examiner* — James J Lee
*Assistant Examiner* — Alexander George Matta
(74) *Attorney, Agent, or Firm* — Norton Rose Fulbright US LLP; Gerard Messina

(57) ABSTRACT

A device for operating a braking system of a motor vehicle, including a first control unit for operating an ABS unit of the braking system and including a second control unit for operating a brake booster unit of the braking system. The control units are designed as application-specific integrated circuits and are connected to a microprocessor for their control, the microprocessor including a separate shut-off path for each of the circuits.

8 Claims, 1 Drawing Sheet

(51) Int. Cl.
*B60T 13/68* (2006.01)
*B60T 17/22* (2006.01)

(52) U.S. Cl.
CPC ......... *B60T 17/221* (2013.01); *B60T 2270/10* (2013.01); *B60T 2270/402* (2013.01); *B60T 2270/406* (2013.01)

(58) Field of Classification Search
CPC ......... B60T 2270/402; B60T 2270/406; B60T 8/321; B60T 8/88; B60T 13/662; B60T 17/22; B60Y 2400/81
See application file for complete search history.

(56) References Cited

U.S. PATENT DOCUMENTS

| | | | |
|---|---|---|---|
| 2009/0045672 | A1 | 2/2009 | Nishino et al. |
| 2010/0252378 | A1* | 10/2010 | Hilberer ................. B60T 7/107 303/123 |
| 2011/0057645 | A1* | 3/2011 | Jager ........................ B60T 8/36 324/125 |
| 2016/0114779 | A1* | 4/2016 | Binder ................... B60T 8/171 701/76 |
| 2016/0214582 | A1 | 7/2016 | Brenn et al. |
| 2016/0221561 | A1* | 8/2016 | Leroy .................... B60T 17/02 |

FOREIGN PATENT DOCUMENTS

| | | | |
|---|---|---|---|
| EP | 0379669 A2 | 8/1990 | |
| WO | 2009019022 A2 | 2/2009 | |
| WO | WO-2015188957 A1 * | 12/2015 | .............. B60T 13/20 |

\* cited by examiner

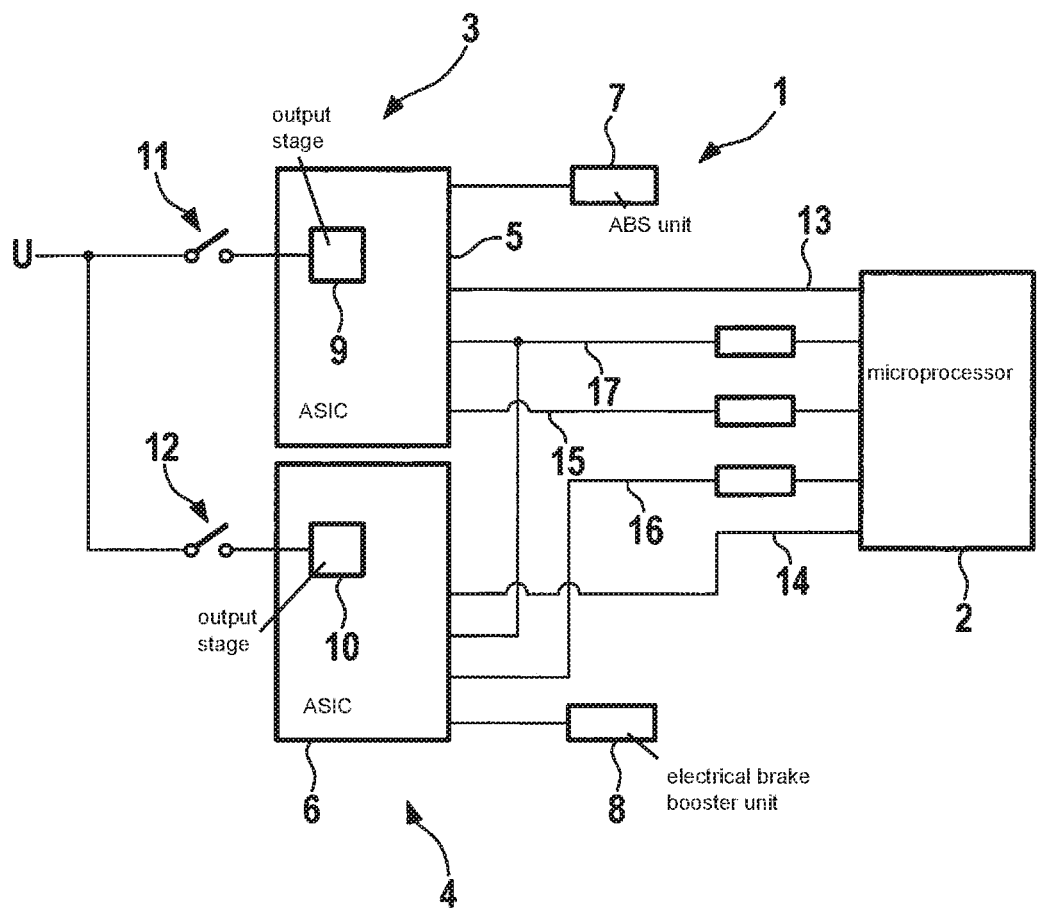

DEVICE AND METHOD FOR OPERATING A BRAKING SYSTEM OF A MOTOR VEHICLE

FIELD

The present invention relates to a device for operating a braking system of a motor vehicle, including a first control unit for operating an ABS unit of the braking system and including a second control unit for operating a brake booster unit of the braking system.

Moreover, the present invention relates to a method for operating a braking system of a motor vehicle with the aid of the aforementioned device.

BACKGROUND INFORMATION

Present-day motor vehicles include braking systems, which encompass an ABS unit for avoiding locking wheels as well as a brake booster unit for facilitating the brake actuation. Conventional brake booster units are available, which also assist the driver during the actuation of the brake pedal, not with the aid of a conventional vacuum brake booster, but rather in an electric motor-operated or electromagnetic manner. An additional control unit is necessary therefor, which controls or regulates the behavior of the braking system depending on the actuation of the brake pedal. A separate control unit is assigned to the ABS unit, which controls one or multiple valves in the braking system, in order to reduce, as necessary, a hydraulic pressure, which acts on wheel brakes, so that a braking force is reduced and a wheel on the verge of locking is prevented from locking. Previously, the functions of the ABS unit and of the brake booster unit were implemented in the vehicle with the aid of control units separated from one another. As part of the standardization and simplification of control systems, control units are sought, which combine the two functions, i.e., the function of the ABS control and of the brake boosting.

SUMMARY

An example device according to the present invention may have the advantage that, during a failure or a malfunction in one of the subsystems, i.e., for example, in the ABS unit or in the brake booster unit, a further operation of the motor vehicle and, in particular, of the braking system is possible, albeit with reduced function. The failure of one of the units or of a subsystem is preferably displayed to the driver or the occupants of the motor vehicle, so that they may act and, for example, drive to the nearest workshop. If the braking system would fail in its entirety, such a maneuver would possibly no longer be implementable. As a result, due to the device according to the present invention, an advantageous further operation of the motor vehicle or an emergency operation is made possible, and, that a shared braking system control unit controls both functions and both units. According to the present invention, this is achieved due to the fact that the control units are designed as application-specific integrated circuits and are connected to a microprocessor for their control, the microprocessor including a separate shut-off path for each of the circuits. Therefore, the two aforementioned units are operated independently of one another with the aid of the particular application-specific integrated circuits (ASICs), the circuits to the microprocessor each including a separate shut-off path, so that they may be deactivated independently of one another by the microprocessor in order to prevent a further operation of the particular unit or function. The remaining control unit further operates the units assigned thereto, so that the braking system remains available at least in an emergency operating mode. Preferably, the circuits (ASICs) are situated on a shared circuit board, preferably in a shared housing.

Moreover, it is preferably provided that the circuits each include at least one output stage, preferably multiple output stages, for controlling electrically, in particular, electromagnetically actuatable hydraulic valves of the braking system. Due to the output stages, the hydraulic valves or their actuator units are supplied with sufficient energy in order to open or close, so that a hydraulic pressure, for example, is decreased in order to avoid a locking of a wheel, or is increased in order to assist the driver of the motor vehicle during the actuation of the braking system.

Moreover, it is preferably provided that the particular output stage is deactivatable with the aid of the particular shut-off path. The shut-off paths therefore act upon the output stages and make it possible for the particular output stage to be deactivated by the microprocessor and, therefore, a further energization of the particular hydraulic valve is prevented.

Moreover, it is preferably provided that an actuatable switch is assigned to each circuit, with the aid of which the particular circuit is connectable to or disconnectable from a supply voltage. If the particular switch is closed, the output stage is connected to the supply voltage, so that it may be controlled by the microprocessor or the particular circuit. If the switch is opened, the electrical connection to the supply voltage is disconnected and the output stage is no longer operable. As a result, security against a malfunction or for a faulty operation of one of the units, in particular of one of the hydraulic valves, is reliably ensured if the particular switch is open.

The microprocessor is preferably designed for monitoring the braking system for malfunctions and, depending on a detected malfunction, deactivating the at least one of the circuits via the particular shut-off path. In particular, with the aid of the shutoff, as mentioned above, the particular output stage is deactivated and, particularly preferably, is disconnected from the supply voltage. Microprocessors, which monitor the systems for malfunctions, are known, in principle, so that these are not explained in greater detail at this point. It is of significance for the present invention that the microprocessor activates one or both shut-off paths in the case of a detected malfunction in order to deactivate the particular unit or the particular circuit.

In particular, the microprocessor is designed for activating at least one of the switches depending on a detected malfunction. As mentioned above, via the actuation of the switches, the particular output stage is disconnected from the supply voltage and, as a result, a malfunction or the effect of a malfunction is prevented.

Moreover, it is preferably provided that, upon detection of a malfunction, only one of the circuits is deactivated and, optionally, the switch assigned to this circuit is activated in order to disconnect the circuit from the supply voltage. Depending on the malfunction, the microprocessor decides whether only the circuit or also the switch assigned to the circuit must be activated in order to avoid a faulty operation of the selected unit and, therefore, of the braking system in its entirety and to allow for an emergency operation.

Moreover, it is preferably provided that, upon detection of a malfunction of the ABS unit, the first circuit and, optionally, the first switch are deactivated. Correspondingly, it is preferably provided that, upon detection of a malfunction of the brake booster unit by the microprocessor, only the second circuit is deactivated and the second switch is activated in order to disconnect the output stage from the supply voltage. This yields the aforementioned advantages.

An example method according to the present invention may be distinguished by the fact that the ABS unit and the brake booster unit are monitored for malfunctions, and, depending on a detected malfunction, at least one of the control units is deactivated by the microprocessor via the particular shut-off path. As a result, the aforementioned advantages are obtained.

Further advantages and preferred features and combinations of features result, in particular, from the above description.

The present invention is explained in greater detail in below with reference to the FIGURE.

BRIEF DESCRIPTION OF THE DRAWING

The FIGURE shows a device for operating a braking system of a motor vehicle not represented here in greater detail.

DETAILED DESCRIPTION OF EXAMPLE EMBODIMENTS

The FIGURE shows a device 1 for operating a braking system of a motor vehicle not represented here in greater detail. Device 1 is designed as a control unit in this case and includes a microprocessor 2, which carries out a method for operating the braking system, which, inter alia, includes monitoring the braking system for malfunctions. Moreover, device 1 includes a first control unit 3 and a second control unit 4, each of which is designed as an application-specific integrated circuit 5 and 6, respectively. First control unit 3 is assigned to an ABS unit 7 and second control unit 4 is assigned to an electrical brake booster unit 8 of the braking system. Each of the two units 7, 8 includes one or multiple electrically actuatable hydraulic valve(s), which function in the hydraulic circuit of the braking system. The hydraulic valves of the ABS unit (ABS=anti-lock system) are used for reducing a hydraulic pressure, as necessary, in order to reduce a braking torque, so that a locking of at least one wheel of the motor vehicle is avoided. The hydraulic valve(s) of the brake booster unit is/are used upon activation, for example, for increasing a hydraulic pressure in the braking system in order to assist the driver during the actuation of the brake pedal, so that the hydraulic force generated in the braking system does not depend exclusively on the actuating force of the driver. Such a brake booster unit replaces, for example, the conventional vacuum booster.

For the purpose of activating the hydraulic valves, circuits 5 and 6 include output stages 9 and 10, respectively, which are connected to a supply voltage U. An actuatable switch 11 or 12, respectively, is situated in the particular connection to supply voltage U. Switches 11, 12 are preferably also activatable by microprocessor 2 in order to disconnect output stages 9, 10 from supply voltage U as necessary. Preferably, circuits 5, 6, in particular together with output stages 9, 10, are situated on a shared circuit board in a housing, in particular a control unit housing.

Microcontroller 2 is connected to both control units 3, 4 via a BUS system 13 and 14, respectively, in particular a serial peripheral interface, for the activation thereof.

In addition, the microcontroller is connected to circuit 5 via a shut-off path 15 and to circuit 6 via a shut-off path 16. In addition, the microcontroller is connected to both circuits 5 and 6 via a shut-off path 17.

Due to presented device 1, the availability of the braking system is enhanced also upon occurrence of a malfunction. The situation is avoided in which a malfunction causes the entire braking system to fail. Due to the greater availability obtained due to the cascaded shutoff of the present invention described below, the driver more rarely encounters a situation in which a desired function is not available. For this purpose, the monitoring of the braking system by microcontroller 2 is of particular significance. Microcontroller 2 monitors the system initially for malfunction and classifies the particular detected malfunction in order to subsequently further operate the braking system in its entirety in an operating mode having limited functionality, i.e., in an emergency operating mode.

This is based on carrying out the main function of the ABS and the brake boosting via separate circuits 5, 6 and providing it with independent shut-off paths. The two circuits 5, 6 may be identically designed with respect to type; it is important that the assignment of the hydraulic valves to circuits 5, 6 takes place according to their function.

With the aid of shut-off path 15, 16, in particular, output stages 9, 10 of circuits 5, 6, respectively, may be shut off or are deactivatable. If a shutoff command takes place via shut-off path 17, both output stages 9, 10 are shut off. This is the case, for example, when the malfunction is so serious that safe operation of the motor vehicle or of the braking system in the presence of the malfunction may no longer be ensured.

If microcontroller 2 detects, for example, a malfunction in a hydraulic valve, which is necessary for the ABS regulation and is activated by circuit 5, microcontroller 2 transmits a shutoff command via shut-off path 15 to circuit 5 in order to deactivate output stage 9. Additionally, microprocessor 2 also activates switch 11 in order to disconnect the connection to the supply voltage. Second circuit 6 continues to operate and continues to allow for unrestricted brake boosting.

However, if a component necessary for the pressure build-up fails, for example, a hydraulic valve assigned to the braking pressure build-up, circuit 6 is deactivated and, in particular, switch 12 is opened. In this case, the ABS function is then still available, without restriction, via circuit 5.

What is claimed is:

1. A device for operating a braking system of a motor vehicle, the device comprising:
   a first application-specific integrated circuit that includes a first output stage, the first output stage being configured to operate opening and closing of hydraulic valves of an ABS unit of the braking system;
   a second application-specific integrated circuit that includes a second output stage, the second output stage being configured to operate opening and closing of hydraulic valves of a brake booster unit of the braking system;
   a bus system;
   a voltage supply;
   a first switch arranged between the voltage supply and the first application-specific integrated circuit;
   a second switch arranged between the voltage supply and the second application-specific integrated circuit; and
   a single microprocessor connected via the bus system to the first and second output stages for control of activation of each of the first and second output stages using bus signals transmitted by the microprocessor over bus lines of the bus system, wherein the single microprocessor is configured to, without using signals over the bus system:

selectively deactivate the first application-specific integrated circuit, independently of the second application-specific integration circuit, by operating the first switch to cut off a connection of the voltage supply to the first application-specific integrated circuit; and selectively deactivate the second application-specific integrated circuit, independently of the first application-specific integration circuit, by operating the second switch to cut off a connection of the voltage supply to the second application-specific integrated circuit.

2. The device as recited in claim 1, wherein the microprocessor is configured to monitor the braking system for malfunctions and, depending on a detected malfunction, perform the deactivation of at least one of the first and second output stages via a respective shut-off path.

3. The device as recited in claim 1, wherein the microprocessor is configured to monitor the braking system for malfunctions and perform the selective deactivations by the operation of the respective switches depending on a detected malfunction.

4. The device as recited in claim 1, wherein, upon detection of a malfunction of the ABS unit, the first switch is operated to disconnect the first output stage of the first application-specific integration circuit from the voltage supply, while the second output stage remains connected to the voltage supply via the second switch.

5. The device as recited in claim 1, wherein, upon detection of a malfunction of the brake booster unit, only the second switch is operated to disconnect the second output stage of the second application-specific integration circuit from the voltage supply, while the first output stage remains connected to the voltage supply via the first switch.

6. The device as recited in claim 1, further comprising a single circuit board on which the first and second application-specific integration circuits are both arranged.

7. A method for operating a braking system of a motor vehicle using a device, the device including (a) a first application-specific integrated circuit that includes a first output stage, the first output stage being configured to operate opening and closing of hydraulic valves of an ABS unit of the braking system, (b) a second application-specific integrated circuit that includes a second output stage, the second output stage being configured to operate opening and closing of hydraulic valves of a brake booster unit of the braking system, (c) a bus system, (d) a voltage supply, (e) a first switch arranged between the voltage supply and the first application-specific integrated circuit, (f) a second switch arranged between the voltage supply and the second application-specific integrated circuit, and (g) a single microprocessor connected via the bus system to the first and second output stages for control of activation of each of the first and second output stages using bus signals transmitted by the microprocessor over bus lines of the bus system, wherein the single microprocessor is configured to, without using signals over the bus system: (I) selectively deactivate the first application-specific integrated circuit, independently of the second application-specific integration circuit, by operating the first switch to cut off a connection of the voltage supply to the first application-specific integrated circuit, and (II) selectively deactivate the second application-specific integrated circuit, independently of the first application-specific integration circuit, by operating the second switch to cut off a connection of the voltage supply to the second application-specific integrated circuit, the method comprising:

monitoring the ABS unit and the brake booster unit for malfunctions; and depending on a detected malfunction, deactivating at least one of the first and second application-specific integration circuit by the respective one of the first and second switches.

8. A device for operating a braking system of a motor vehicle, the device comprising:

a first application-specific integrated circuit that includes a first output stage, the first output stage being configured to operate opening and closing of hydraulic valves of an ABS unit of the braking system;

a second application-specific integrated circuit that includes a second output stage, the second output stage being configured to operate opening and closing of hydraulic valves of a brake booster unit of the braking system;

a voltage supply;

a first switch arranged between the voltage supply and the first application-specific integrated circuit;

a second switch arranged between the voltage supply and the second application-specific integrated circuit; and a single microprocessor for controlling both of the first and second application-specific integrated circuits and that is configured to perform the following in case of a detected fault of a respective one of the first and second application-specific integrated circuits in order to deactivate the respective application-specific integrated circuit:

select from two predefined types of deactivation by determining which of the two predefined types of deactivation is required for the detected fault, wherein (a) the first predefined type of deactivation includes transmission of a deactivation signal to the respective application-specific integrated circuit that deactivates the respective application-specific integrated circuit from operating the opening and closing of hydraulic valves for which the respective application-specific integrated circuit is configured without operating the respective switch of the respective application-specific integrated circuit to cutoff the voltage supply from the respective application-specific integrated circuit and (b) the second predefined type of deactivation to includes operating the respective switch of the respective application-specific integrated circuit to cutoff the voltage supply from the respective application-specific integrated circuit; and based on the selection, perform at least one of the first and second predefined types of deactivation.

* * * * *